(12) United States Patent
Hardy et al.

(10) Patent No.: US 12,081,674 B2
(45) Date of Patent: Sep. 3, 2024

(54) DETECTING FAILURES IN REMOTE ONLINE NOTARIZATION SESSION AND WORKFLOW INITIATION FOR CURING SAME

(71) Applicant: DocuSign, Inc., San Francisco, CA (US)

(72) Inventors: Alexander Hardy, Austin, TX (US); Allan Keller, Austin, TX (US); Peter Rung, Austin, TX (US)

(73) Assignee: DOCUSIGN, INC., San Francisco, CA (US)

( * ) Notice: Subject to any disclaimer, the term of this patent is extended or adjusted under 35 U.S.C. 154(b) by 375 days.

(21) Appl. No.: 17/190,039

(22) Filed: Mar. 2, 2021

(65) Prior Publication Data

US 2022/0286293 A1    Sep. 8, 2022

(51) Int. Cl.
*H04L 9/32*      (2006.01)
*G06Q 50/18*    (2012.01)
(Continued)

(52) U.S. Cl.
CPC .......... *H04L 9/3247* (2013.01); *G06Q 50/18* (2013.01); *H04L 65/1083* (2013.01); *H04L 65/4015* (2013.01)

(58) Field of Classification Search
CPC .............. H04L 9/3247; H04L 65/1083; H04L 65/4015; G06Q 50/18
See application file for complete search history.

(56) References Cited

U.S. PATENT DOCUMENTS 9,984,242 B2 * 5/2018 Follis .................. G06Q 10/103
10,055,747 B1 * 8/2018 Sherman ............. G06F 21/6245
(Continued)

FOREIGN PATENT DOCUMENTS

AU          759002 B2 *  4/2003
CN     109544094 A     3/2019
(Continued)

OTHER PUBLICATIONS

International Search Report and Written Opinion, Patent Treaty Cooperation Application No. PCT/US2021/043031, dated Oct. 29, 2021, 11 pages.
(Continued)

*Primary Examiner* — Jeffrey C Pwu
*Assistant Examiner* — Mayasa A. Shaawat
(74) *Attorney, Agent, or Firm* — Shumaker & Sieffert, P.A.

(57) ABSTRACT

A system and a method are disclosed where a server determines parameters for establishing a remote online notarization session, the remote online notarization session including participants, the participants including at least a signer and a notary. The server establishes the session according to the parameters, and monitors, during the session, information from the signer client device and the notary client device. The server detects a failure from the information based on at least one of the signer client device and the notary client device having failed to comply with a parameter of the parameters. Responsive to detecting the failure, the server pauses the remote online notarization session and outputting a selectable cure option to at least one of the participants that, when selected initiates a workflow that, when concluded, cures the failure and enables the remote online notarization session to proceed.

18 Claims, 4 Drawing Sheets

(51) Int. Cl.
*H04L 65/1083* (2022.01)
*H04L 65/401* (2022.01)

(56) References Cited

U.S. PATENT DOCUMENTS

| | | | |
|---|---|---|---|
| 10,110,385 | B1 | 10/2018 | Rush et al. |
| 10,373,277 | B2 | 8/2019 | Kaminski et al. |
| 10,769,360 | B1* | 9/2020 | Arnold .................. G06F 40/174 |
| 2002/0143704 | A1 | 10/2002 | Nassiri |
| 2006/0039471 | A1 | 2/2006 | Dane et al. |
| 2008/0100874 | A1 | 5/2008 | Mayer |
| 2008/0209516 | A1 | 8/2008 | Nassiri |
| 2009/0327144 | A1 | 12/2009 | Hatter et al. |
| 2010/0161993 | A1 | 6/2010 | Mayer |
| 2014/0052564 | A1 | 2/2014 | Lewis |
| 2014/0189728 | A1 | 7/2014 | Lecomte et al. |
| 2015/0150141 | A1 | 5/2015 | Szymanski et al. |
| 2015/0295922 | A1 | 10/2015 | Dunn et al. |
| 2016/0132818 | A1 | 5/2016 | Camenzind et al. |
| 2017/0004591 | A1* | 1/2017 | Kaminski ............. H04L 63/083 |
| 2017/0352012 | A1* | 12/2017 | Hearn .................. G06Q 20/382 |
| 2019/0121846 | A1* | 4/2019 | Kim .................... G06F 3/04883 |
| 2019/0319948 | A1* | 10/2019 | Triola .................. H04L 9/3218 |
| 2019/0354706 | A1 | 11/2019 | Bartlett et al. |
| 2020/0204370 | A1 | 6/2020 | Wisniewski |

FOREIGN PATENT DOCUMENTS

| | | |
|---|---|---|
| JP | H10327147 A | 12/1998 |
| KR | 20080043287 A | 5/2008 |
| KR | 20170096808 A | 8/2017 |

OTHER PUBLICATIONS

U.S. Appl. No. 17/039,348, filed Sep. 30, 2020, Inventor Alexander Hardy.
International Search Report and Written Opinion, Patent Treaty Cooperation Application No. PCT/US2022/017860, dated Jun. 8, 2022, 19 pages.
United States Office Action, U.S. Appl. No. 17/039,348, dated Sep. 8, 2022, 18 pages.
Office Action from U.S. Appl. No. 17/190,035 dated Aug. 23, 2023, 12 pp.
Response to Final Office Action dated Aug. 23, 2023 from U.S. Appl. No. 17/190,035, filed Nov. 20, 2023, 9 pp.
Final Office Action from U.S. Appl. No. 17/190,035 dated Feb. 29, 2024, 13 pp.

* cited by examiner

DETECTING FAILURES IN REMOTE ONLINE NOTARIZATION SESSION AND WORKFLOW INITIATION FOR CURING SAME

TECHNICAL FIELD

The disclosure generally relates to the field of secure electronic documents, and more particularly relates to enabling participants to cure a failure in a remote online notarization session to enable a secure electronic document to be notarized.

BACKGROUND

Remote online notarization sessions enable signers of documents to have a document signed and notarized electronically, thus providing convenience in eliminating a need to physically visit a notary in order to have a document notarized. Remote online notarization poses challenges that do not exist in a physical notarization scenario, in that integrity of the session may be jeopardized by factors that do not exist in the physical notarization scenario.

SUMMARY

Systems and methods are disclosed herein that determine parameters that are to be satisfied for a remote online notarization session to conclude successfully, and then monitor a remote online notarization session for compliance with those parameters. Where a failure is detected, the system determines a cure, and outputs an option to at least one participant of the remote online notarization session. When selected, the option initiates a workflow to cure the failure, after which a paused session may proceed to a successful conclusion, thus resulting in a signed and notarized secure electronic document.

In an embodiment, a server determines parameters for establishing a remote online notarization session, the remote online notarization session including participants, the participants including at least a signer and a notary. The server establishes the remote online notarization session according to the parameters, the signer connecting using a signer client device, and the notary connecting using a notary client device. The server monitors, during the remote online notarization session, information from the signer client device and the notary client device.

The server detects a failure from the information, the failure detected based on at least one of the signer client device and the notary client device having failed to comply with a parameter of the parameters. Responsive to detecting the failure, the server pauses the remote online notarization session and outputting a selectable cure option to at least one of the participants. Responsive to receiving a selection of the selectable cure option, the server initiates a workflow that, when concluded, cures the failure and enables the remote online notarization session to proceed.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Remote Online Notarization Service System Environment

Figure 1:
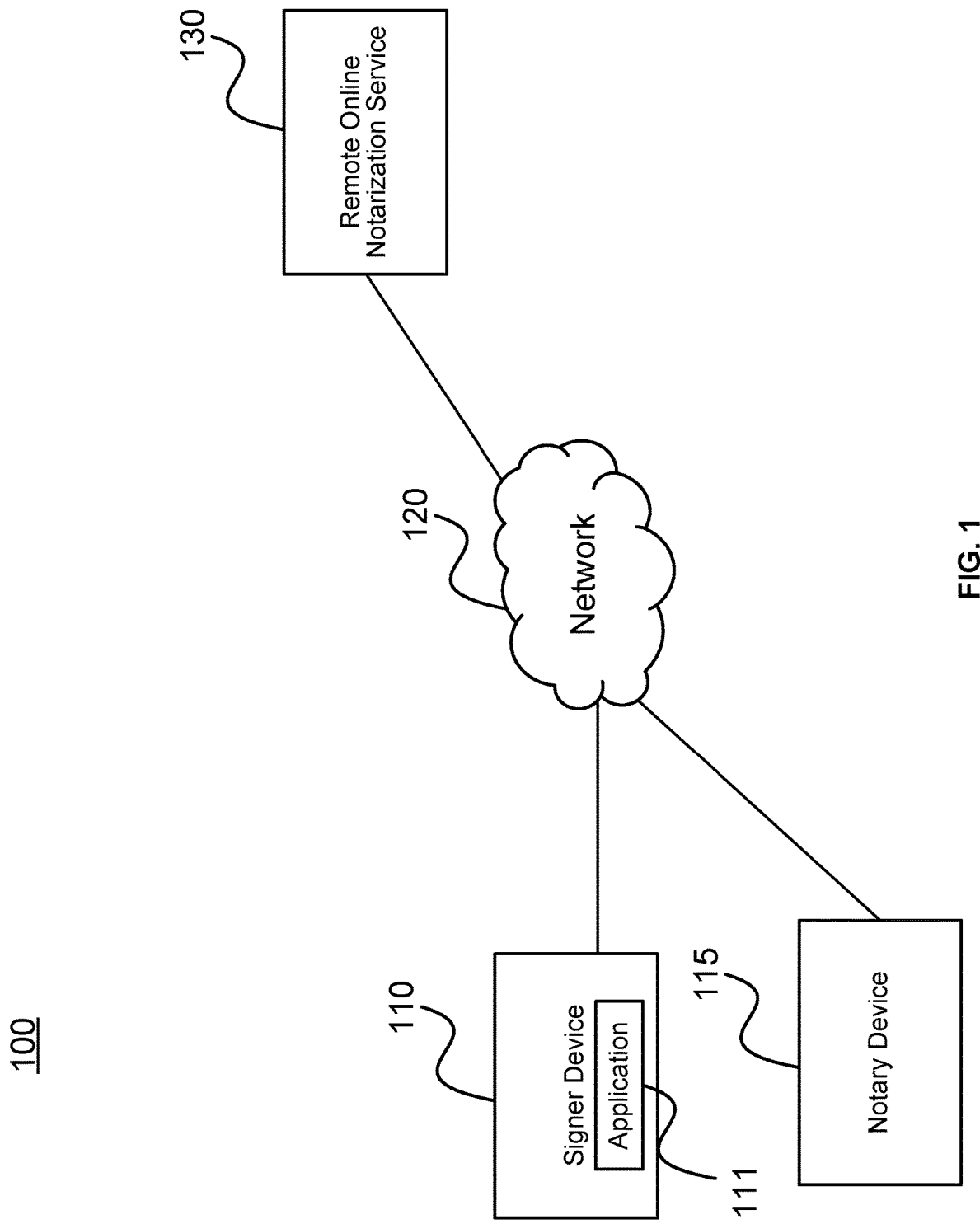
FIG. 1 illustrates one embodiment of a system environment for operating a remote online notarization service.

FIG. 1 illustrates one embodiment of a system environment for operating a remote online notarization service. Environment 100 includes signer device 110 with application 111 installed thereon, notary device 115, network 120, and remote online notarization service 130. Signer device 110 and notary device 115 are client devices. The elements of environment 100 are exemplary only, and more or fewer elements may be implemented without departing from the scope of the disclosure.

Environment 100 includes various client devices, such as signer device 110 (with application 111 installed thereon) and notary device 115. The client devices communicate with remote online notarization service 130 through network 120. The term client device, as used herein, may refer to a computing device such as smartphones with an operating system such as ANDROID® or APPLE® IOS®, tablet computers, laptop computers, desktop computers, electronic stereos in automobiles or other vehicles, or any other type of network-enabled device from which secure documents may be accessed or otherwise interacted with. Typical client devices include the hardware and software needed to input and output sound (e.g., speakers and microphone) and images, connect to the network 120 (e.g., via Wifi and/or 4G or other wireless telecommunication standards), determine the current geographic location of the client devices 100 (e.g., a Global Positioning System (GPS) unit), and/or detect motion of the client devices 100 (e.g., via motion sensors such as accelerometers and gyroscopes).

Signer device 110 is operated by a signer of an envelope. The term signer, as used herein, may refer to a person who is to apply a signature to one or more secure documents in an envelope. The term signature, as used herein, may refer to any notation whereby the signer acknowledges a provision in the envelope. Example signatures may include a signing of one's full name, initials, or any other form of acknowledgment whether or not the signature identifies the signer. A secure document (sometimes referred to herein as a "document") is an electronic document with security encoded in association therewith to ensure integrity of the document. An example of a secure document is a document for signature by a user of signer device 110, where the document is unable to be modified by the user other than to add signatures to the document. Secure documents need not be signature documents, and may be any document that has security features that limit activity of a receiving user and/or otherwise use features that ensure the integrity of the documents. The term envelope, as used herein, may refer to a collection of one or more associated secure documents. For example, an envelope may include several secure documents, some or all of which may require signature and/or notarization in order to be validated. While only one signer device is depicted in environment 100, any number of signer devices may be present (e.g., where multiple signers are required in order to complete an envelope).

Signer device 110, as depicted, has application 111 installed thereon. Any or all client devices in environment 100 may have application 111 installed thereon. Application 111 may be a stand-alone application downloaded by a client device from secure document service 130. Alternatively, application 111 may be accessed by way of a browser installed on the client device, accessing an application instantiated from secure document service 130 using the browser. In the case of a stand-alone application, browser functionality may be used by application 111 to access certain features of secure document service 130 that are not downloaded to the client device. Application 111 may be used by a client device to perform any activity relating to a secure document, such as to create, design, assign permissions, circulate, access, sign, notarize, modify, add pictorial content, and so on.

Notary device 115 is a client device operated by a notary. The term notary, as used herein, may refer to a person authorized to validate a secure document. The authorization may be bestowed upon the notary by a relevant agency (e.g., a government agency in a jurisdiction in which the notary resides or works, or which pertains to the envelope to be notarized). Notarization refers to any form of validation, including apostille and any other form of legalization of a secure document.

Remote online notarization service 130 facilitates a notarization of an envelope during a notarization session. Where an envelope is successfully notarized, remote online notarization service 130 validates the envelope. Remote online notarization service 130 applies one or more protocols that, if breached, would cause a notarization of an envelope to fail or not act to validate the envelope. Details of operation of remote online notarization service 130 are further described below with reference to FIG. 2.

Exemplary Remote Online Notarization Service Activity

Figure 2:
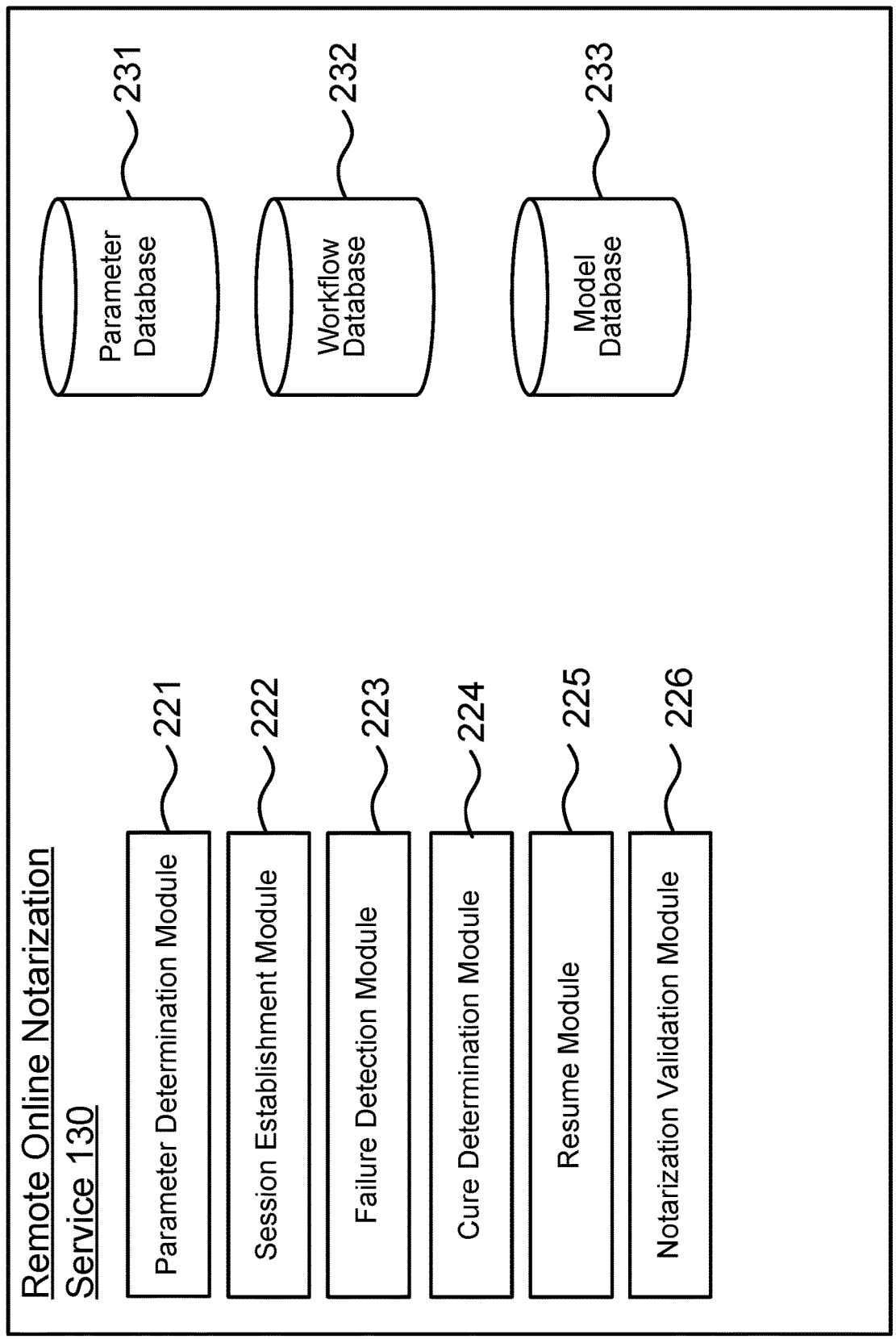
FIG. 2 illustrates one embodiment of exemplary modules and databases used by the remote online notarization service.

FIG. 2 illustrates one embodiment of exemplary modules and databases used by the remote online notarization service. As depicted in FIG. 2, remote online notarization service 130 includes parameter determination module 221, session establishment module 222, failure detection module 223, cure determination module 224, resume module 225, notarization validation module 226, parameter database 231, workflow database 232, and model database 233. The modules and databases shown in FIG. 2 are merely exemplary; fewer or more modules and/or databases may be used to achieve the activity described herein. Moreover, module activity described with respect to remote online notarization service 130 may be distributed across multiple servers and/or may be instantiated in whole or in part on application 111 of one or more client devices.

Parameter determination module 221 determines parameters for a remote online notarization session (interchangeably referred to herein simply as a "session") between participants. The term participant, as used herein, may refer to any person present in a remote online notarization session. This may include, but is not limited to, a signer, a notary, and a witness. The term witness, as used herein, may refer to a person who signs a secure electronic document, but is distinguished from a signer in that the witness may be any qualifying person, whereas the signer is a particular person that is party to the secure electronic document and cannot be substituted with another signer absent exceptional circumstances (e.g., an agent of the signer is authorized to sign on behalf of the signer). The term remote online notarization session as used herein may refer to a session in which participants are present, and where a protocol is established for validating a notarization of a signature on at least a portion of an envelope.

In an embodiment, parameter determination module 221 determines parameters based on input from one or more participants to a remote online notarization session. The parameters may include an indication of the participants of the session. For example, remote online notarization service 130 may receive input from a user requesting to establish a remote online notarization session. The input may include any number of parameters, such as an indication of required participants, optional participants, and roles of those participants (e.g., signer, co-signer, notary, witness, etc.). The term co-signer, as used herein, may refer to one or more additional signers, relative to the requesting user, who are indicated in the envelope as required to sign the envelope for the envelope to be completed. While required participants may be required to be present throughout a session, optional participants may exit the session without breaching a requirement of the session. In an embodiment, parameter identification module 222 automatically identifies the user who operates the client device that requested to establish the remote online notarization session as a required participant.

In connection with receiving input regarding the participants of the session, remote online notarization service 130 may provide recommendations of candidate participants to the user, from which the user may select certain candidate participants to invite to the remote online notarization session. For example, parameter determination module 221 may access a profile of the requesting user, and may determine therefrom an association to candidate participants. For example, parameter determination module 221 may determine that the user is associated with a certain conglomerate, and may identify notaries and/or witnesses associated with that conglomerate. In such an embodiment, parameter determination module 221 may include in a prompt to the requesting user including selectable options to invite the associated candidate participants to the session, where the user may select which of the candidates to select. Alternatively, parameter determination module 221 may automatically select one or more candidates depending on the needs of the session (e.g., parameters are determined, as described below, that there is a need for one or more notaries and/or witnesses to attend the session), and based on data reflected in the profiles of the candidates (e.g., availability of the candidates indicated in a data structure lining up with a date and time indicated for the remote online notarization session). Parameter determination module 221 may transmit invitations to selected candidates that, when accepted, cause participant identification module 222 to identify the accepting candidate as a participant of the session, and thus cause parameter determination module 221 to include these participants as parameters for the session.

Parameter determination module 221 may identify participants automatically based on content of the envelope to be notarized during the session. For example, the envelope may indicate names of persons responsible for signing one or more portions of the envelope, and may automatically identify electronic communications addresses (e.g., email addresses, telephone numbers, etc.) and use those addresses to transmit requests to those persons to join the session as participants. Parameter determination module 221 may additionally, or alternatively, identify generic parameters for the session (e.g., that a certain number of witnesses are required), and transmit requests to arbitrary persons (e.g., candidate witnesses) based on information of those candidates' profiles.

In an embodiment (e.g., where the signer is not the requesting user), parameter determination module 221 may automatically identify one or more signers. Parameter determination module 221 may determine, based on information of the envelope itself, which parties are named as signers. Parameter determination module 221 may access user profiles of the identified one or more signers, and may transmit a request to the signers to join the session as participants. Responsive to receiving an acceptance of the request, parameter determination module 221 may generate parameters that identify those one or more signers as required participants of the remote online notarization session.

Parameters of a session may go beyond simply parameters governing the participants, and which participants are required. The parameters may dictate requirements of a remote online notarization session in any regard, including, for example, technical requirements (e.g., hardware, memory, and network bandwidth requirements for each participant of the session), identity verification requirements (e.g., which protocol(s) are to be used to verify an identity of a signer), credentialing requirements (e.g., a level of credential needed and/or a number of notaries and/or witnesses required), regulatory requirements (e.g., a requirement that a document be apostilled), and so on. In an embodiment, any of these requirements may be input by a user requesting to establish a session (e.g., by selecting selectable options that indicate which requirements apply). In an embodiment, parameter determination module 221 receives an express input of these requirements (e.g., a user selects from candidate requirements for any or all of technical requirements, identity verification requirements, credentialing requirements, and regulatory requirements). In an embodiment, parameter determination module 221 receives an input of a category (e.g., low, medium, or high), the category mapping to a respective level of rigor of parameters. Categories may be selected for a remote online session as a whole, and/or may be selected for each type of requirement (that is, technical, regulatory, identity verification, and so on may have different categories selected). Parameter determination module 221 assigns parameters based on the received selections from the user. Where categories are selected, mappings of the categories to their corresponding parameters may be looked up by parameter determination module 221 using parameter database 231.

Parameter determination module 221 may, in addition or alternative to, determining requirements based on user input, may automatically identify parameters. For example, parameter determination module 221 may identify an envelope to be notarized during the remote online notarization session. The requesting user may identify the envelope as part of initiating the request to establish the remote online notarization session (e.g., by attaching the envelope, or by pointing to a memory address associated with the envelope). Parameter determination module 221 may analyze the envelope to determine parameters of the remote online notarization session. Analyzing the envelope may include an analysis of the contents of the envelope (e.g., the textual and pictorial content within the secure electronic documents that form the envelope) and/or metadata of the envelope.

In an embodiment, parameter determination module 221 determines a value associated with the envelope. The value may be absolute, or may be relative to values of other known envelopes (e.g., ranking using discrete categorizations of value such as high, medium, low, or on a continuous numerical scale). Parameter determination module 221 may determine the value by directly extracting the value from the contents of the envelope. Alternatively, parameter determination module 221 may determine the value associated with the envelope by inputting at least a portion of the contents into a machine learning model (e.g., retrieved from model database 233), and receiving, as output from the machine learning model, a value. The machine learning model may be trained using training data that labels keywords, or collections of keywords (e.g., keywords that are found within a certain distance of one another, or within a same grammar structure such as a paragraph), or a combination thereof with an indication of value. For example, keywords associated with an acquisition of a conglomerate by another conglomerate may be paired with a label indicating that this is a high stakes envelope, and keywords associated with an acquisition of a toy may be paired with a label indicating that this is a low stakes envelope. Parameter determination module 221 may determine the value to be a parameter of the envelope.

Parameter determination module 221 may determine one or more locations associated with the envelope. Similar to a value determination, Parameter determination module 221 may determine a location by directly extracting the location, or by inputting the envelope or a portion thereof into a machine learning model, and receive an output of the location. The model may be similarly trained using training data that pairs keywords with a label indicating an associated location. For example, keywords in a certain language (e.g., French) that are associated with a certain dialect may be labeled with a corresponding country and/or region within a country, thus enabling the machine learning model to output locations associated with content of the envelope. Additional signals may be used, such as metadata of the envelope and/or of data packets associated with participants (e.g., an Internet Protocol address may be used to identify location of a given participant, either directly or as an additional signal to the machine learning model).

Parameter determination module 221 may determine parameters of the session to include locations themselves and/or information associated with those locations, such as regulatory rules that apply in those locations. As an example, where a location is determined, parameter determination module 221 may identify notarization rules that apply to that location based on entries of a database that maps locations to such rules, such as a requirement in a country that one witness or two witnesses are required. Mappings of locations and related information to their corresponding parameters may be looked up by parameter determination module 221 in parameter database 231.

In an embodiment, session establishment module 222 establishes a session according to the parameters selected by parameter determination module 221. The session may be established based on a request that indicates some or all of the parameters, and the request may be received from the notary, the signer, or a third party (e.g., witness). Activity relating to establishing and running a remote online notarization session is described in further detail in commonly owned patent application Ser. No. 17/039,348, filed Sep. 30, 2020, the disclosure of which is hereby incorporated by reference herein in its entirety. After the session is established, the remote online notarization session begins, and a signing and notarization process may occur within the session.

Failure detection module 223 detects a failure during the remote online notarization session. Failure is relative to a workflow that should occur during the remote online notarization session, where the workflow corresponds to the parameters of the session. An example workflow is ensuring the participants meet technological requirements, followed by identity verification of the signer, followed by initiating camera and microphone functionality of at least one participant, followed by signing of at least a portion of the envelope, followed by notarization of the signature, followed by validation of the module. This example is non-limiting; any workflow may be determined based on the parameters. For example, session establishment module 222 may select a workflow by referencing the parameters against workflow database 232, and selecting a workflow that corresponds to the parameters. The workflow may include activities in any order that satisfies the parameters.

Failure detection module 223 detects a failure based on a participant device failing to comply with at least one of the parameters and/or with a workflow element. Exemplary failures may include a technical requirement not being met (e.g., bandwidth dips below a threshold requirement), a protocol not being met (e.g., identity verification is not passed), a participant requirement not being met (e.g., a co-signer is not present; a witness disconnects; etc.), and so on. In an embodiment, failure detection module 223 may implement a time-based tolerance before declaring an event a failure. For example, parameters may dictate that a lapsed network connection is not considered to be a failure if cured within a threshold amount of time (e.g., 1 minute). Responsive to detecting a failure, failure detection module 223 may pause a workflow of a remote online notarization session.

Cure determination module 224 determines whether a cure for the failure is available. In an embodiment, cure determination module 224 compares information relating to the failure to data entries in workflow database 232, and determines therefrom whether a cure workflow is available. The term cure workflow, as used herein, refers to a series of events that, if followed through to completion, would cure the detected failure and allow the workflow of the remote online notarization session to resume from where it was paused. Responsive to determining that a cure workflow is unavailable, cure determination module 224 may instruct remote online notarization service 130 to re-start or terminate the remote online notarization session. Responsive to determining that a cure workflow is available, cure determination module 224 may initiate the cure workflow.

In an embodiment where the failure was detected due to a capability of a participant's client device not meeting a minimum technical requirement (e.g., because a camera has become disabled, or because bandwidth has dipped below a threshold requirement), cure determination module 224 may determine whether the participant has a secondary device available. Cure determination module 224 may perform the determination on the secondary device by accessing a profile of the participant, and determining whether a secondary device is registered to the participant. Responsive to identifying a secondary device registered to the participant, cure determination module 224 may prompt the participant to log in to the remote online notarization session using the secondary device. The prompt may be to the primary device used during the remote online notarization session, and/or to a general address of the user (e.g., text message, email, and so on). Responsive to detecting that the participant has logged in using the secondary device (and, e.g., all other parameters are satisfied by the second device), cure determination module 224 may determine that the failure has been cured. In an embodiment, even where a participant has a secondary device, the secondary device may be considered unable to cure a failure where a parameter of the remote online notarization session mandates a same device be used throughout the session. Cure workflows may require a participant logging in through a secondary device to re-do certain already-completed workflow events, such as identity verification and/or a technical requirement verification, prior to cure determination module 224 determining that a failure has been cured.

In an embodiment, where failure is detected based on a signer failing to satisfy an identity verification, cure determination module 224 may output a prompt to the notary, the prompt including a selectable option that enables the notary to manually verify an identity of the signer. Responsive to detecting a selection of the selectable option, cure determination module 224 may initiate a cure workflow that includes manual verification steps. For example, the notary may request information from the signer, may request the signer hold a government-issued identification card to a camera streaming the signer's image during the session, and so on. Cure determination module 224 may verify (e.g., using pattern recognition) that the signer has complied with the cure workflow including each manual verification step. Cure determination module 224 may also verify that the notary has complied with the workflow (e.g., that the notary verified by looking up the information provided by the signer in a trusted database to determine that the information is accurate). Responsive to determining that the signer's identification has successfully been verified, cure determination module 224 may determine that the failure has been cured.

Failure may be, in an embodiment, based on parameters defining expectations that the participants be located in certain geographic locations during the remote online notarization session, where at least one participant is located outside of those certain geographic locations. For example, failure detection module 223 may determine that a participant is in a country other than one or more countries in which the participant was expected to be physically located in during a remote online notarization session (e.g., as determined based on an analysis of the document, as described above with respect to parameter determination module 221). Failure detection module 223 may detect the failure based on any information from a client device of the participant's device, such as Internet Protocol (IP) address, global positioning system (GPS) data, and so on.

Cure determination module 224 may determine whether there is a cure workflow available by determining notarization requirements associated with the present location of the participant. For example, cure determination module 224 may determine based on one or more entries of parameter database 231 that there is an additional requirement for that location that is not satisfied (e.g., all co-signers must sign same in a single remote online notarization session, one or more additional witnesses are required, document must be apostilled, etc.). Cure determination module 224 may initiate a workflow to cure the failure (e.g., by inviting requisite additional participants in a manner consistent with the discussion of parameter determination module 221 above). For example, where an additional witness is required, cure determination module 224 may output a selectable option to the notary that, when selected, initiates an invitation to a witness. Consistent with the foregoing, the selectable option may enable the notary to select the witness, or may, when selected, trigger an identification of an available witness automatically. Responsive to detecting that the witness has joined the remote online notarization session, cure determination module 224 may determine that the failure has been cured.

In an embodiment, cure determination module 224 may determine that the notary lacks credentials required by the parameters of the remote online notarization session. Cure determination module 224 may output a selectable option to the signer to select a secondary or replacement notary to join the remote online notarization session. Responsive to detecting a selection of the selectable option, cure determination module 224 may invite the secondary or replacement notary to the session. Where the secondary or replacement notary joins the session, cure determination module 224 may determine that the failure has been cured.

Resume module 225 resumes the remote online notarization session from a paused state responsive to detecting that the failure has been cured. In an embodiment, responsive to detecting that the failure has been cured, resume module 225 prompts one or more of the participants asking them to indicate that they are ready for the session to resume. Responsive to receiving, from each prompted participant, a selection of a selectable option to confirm that the participant is ready to resume, resume module 225 un-pauses the remote online notarization session. Failure detection module 223 resumes monitoring for failures as the session continues.

Notarization validation module 226 determines whether the remote online notarization session is complete based on determining that the session has not endured failures, or that the failures were cured, up until a time that the document is signed and notarized in accordance with the parameters of the remote online notarization session (that is, that all required signers, notaries, and witnesses, for example, have performed their duties with respect to signing the envelope). Responsive to determining that the remote online notarization session is complete, notarization validation module 226 validates the notarization, and generates a version of a secure envelope that includes all signatures and notarizations performed during the session.

Computing Machine Architecture

Figure 3:
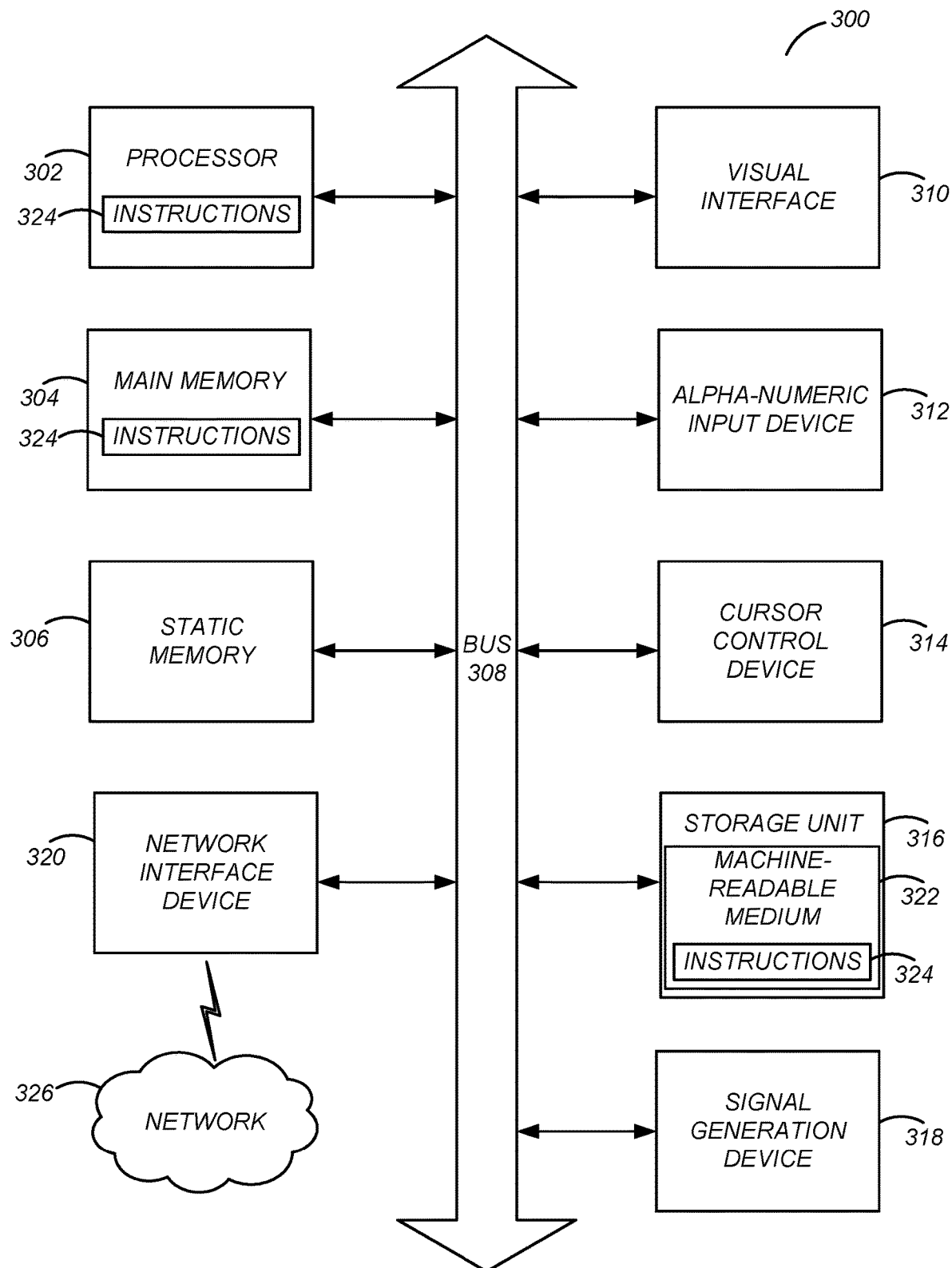
FIG. 3 is a block diagram illustrating components of an example machine able to read instructions from a machine-readable medium and execute them in a processor (or controller).

FIG. 3 is a block diagram illustrating components of an example machine able to read instructions from a machine-readable medium and execute them in a processor (or controller). Specifically, FIG. 3 shows a diagrammatic representation of a machine in the example form of a computer system 300 within which program code (e.g., software) for causing the machine to perform any one or more of the methodologies discussed herein may be executed. The program code may be comprised of instructions 324 executable by one or more processors 302. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 324 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 300 includes a processor 302 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 304, and a static memory 306, which are configured to communicate with each other via a bus 308. The computer system 300 may further include visual display interface 310. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 310 may include or may interface with a touch enabled screen. The computer system 300 may also include alphanumeric input device 312 (e.g., a keyboard or touch screen keyboard), a cursor control device 314 (e.g., a mouse, a trackball, a joystick, a motion sensor, or other pointing instrument), a storage unit 316, a signal generation device 318 (e.g., a speaker), and a network interface device 320, which also are configured to communicate via the bus 308.

The storage unit 316 includes a machine-readable medium 322 on which is stored instructions 324 (e.g., software) embodying any one or more of the methodologies or functions described herein. The instructions 324 (e.g., software) may also reside, completely or at least partially, within the main memory 304 or within the processor 302 (e.g., within a processor's cache memory) during execution thereof by the computer system 300, the main memory 304 and the processor 302 also constituting machine-readable media. The instructions 324 (e.g., software) may be transmitted or received over a network 326 via the network interface device 320.

While machine-readable medium 322 is shown in an example embodiment to be a single medium, the term "machine-readable medium" should be taken to include a single medium or multiple media (e.g., a centralized or distributed database, or associated caches and servers) able to store instructions (e.g., instructions 324). The term "machine-readable medium" shall also be taken to include any medium that is capable of storing instructions (e.g., instructions 324) for execution by the machine and that cause the machine to perform any one or more of the methodologies disclosed herein. The term "machine-readable medium" includes, but not be limited to, data repositories in the form of solid-state memories, optical media, and magnetic media.

Exemplary Failure Detection and Cure Determination Data Flow

Figure 4:
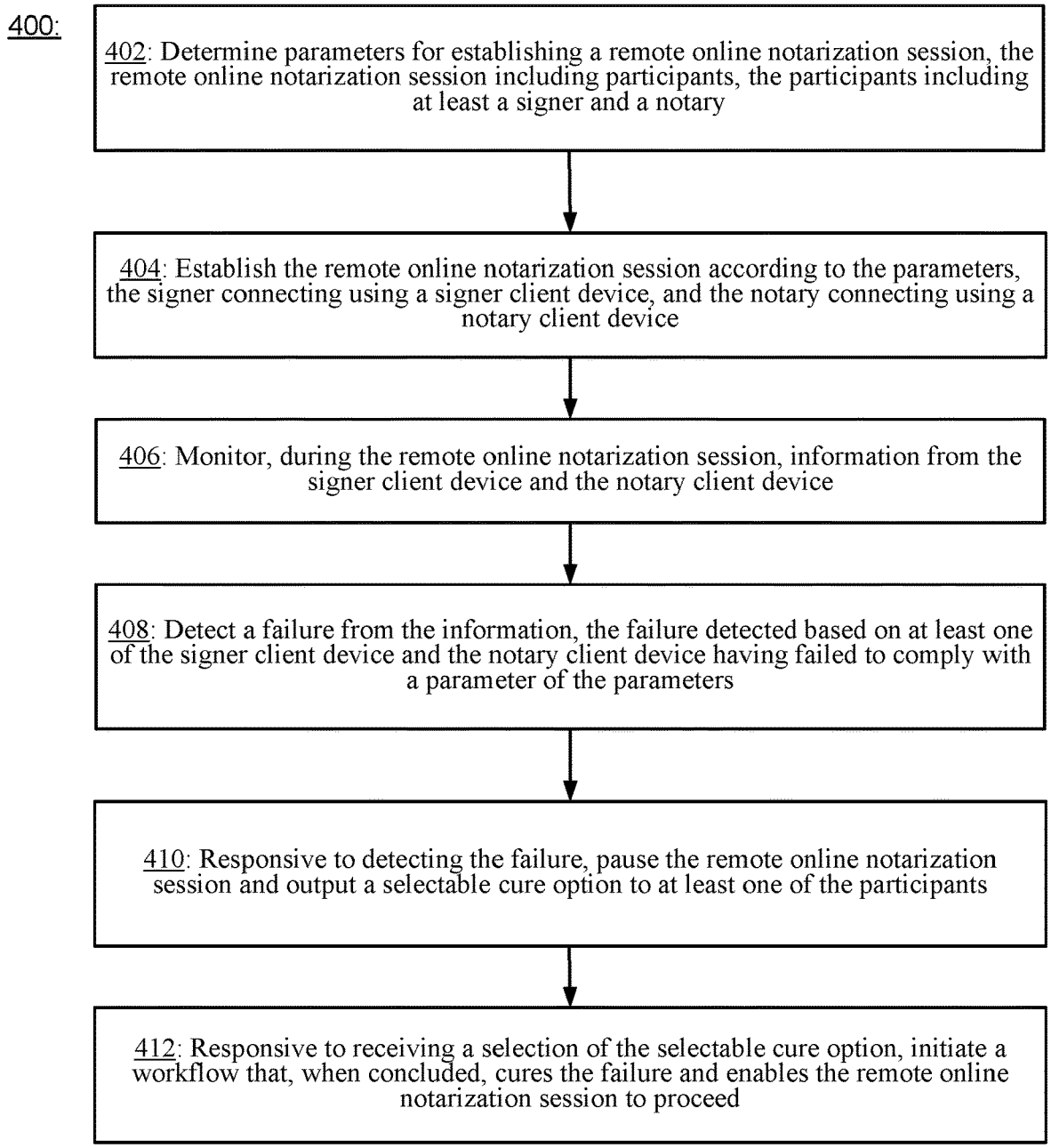
FIG. 4 is an exemplary flowchart showing a data flow for a remote online notarization service curing detected failures during a remote online notarization session.

FIG. 4 is an exemplary flowchart showing a data flow for a remote online notarization service curing detected failures during a remote online notarization session. Process 400 begins with remote online notarization service 130 determining 402 parameters for establishing a remote online notarization session (e.g., using parameter determination module 221), the remote online notarization session including participants, the participants including at least a signer and a notary. Remote online notarization service 130 establishes 404 the remote online notarization session according to the parameters (e.g., using session establishment module 222), the signer connecting using a signer client device, and the notary connecting using a notary client device.

Remote online notarization service 130 monitors 406, during the remote online notarization session, information from the signer client device and the notary client device, and detects 408 a failure from the information (e.g., using failure detection module 223), the failure detected based on at least one of the signer client device and the notary client device having failed to comply with a parameter of the parameters. Responsive to detecting the failure, remote online notarization service 130 pauses 410 the remote online notarization session and outputs a selectable cure option to at least one of the participants (e.g., using cure determination module 224). Responsive to receiving a selection of the selectable cure option, remote online notarization service 130 initiates 412 a workflow that, when concluded, cures the failure and enables the remote online notarization session to proceed (e.g., using resume module 225).

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for running a remote online notarization session through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   determining, by one or more processors and based on an expected physical location, parameters for establishing a remote online notarization session at the expected physical location, the remote online notarization session including participants, the participants including at least a signer and a notary and the parameters specifying the expected physical location;
   establishing, by the one or more processors, the remote online notarization session according to the parameters, the signer connecting using a signer client device, and the notary connecting using a notary client device;
   monitoring, by the one or more processors and during the remote online notarization session, information from the signer client device and the notary client device;
   detecting, by the one or more processors and based on the parameters, a failure from the information, wherein detecting the failure comprises determining, based on the information, that the signer client device is located at a detected physical location different from the expected physical location specified by the parameters;
   responsive to detecting the failure:
     determining, by the one or more processors and based on the detected physical location, a requirement for the detected physical location is not satisfied;
     pausing, by the one or more processors, the remote online notarization session; and
   initiating, by the one or more processors, a workflow that, when concluded, cures the failure and enables the remote online notarization session to proceed, wherein to cure the failure, the workflow at least satisfies the requirement for the detected physical location.

2. The method of claim 1, wherein the parameters further specify a minimum technical requirement of at least one of the signer client device and the notary client device.

3. The method of claim 2, wherein detecting the failure further comprises detecting at least one capability of the signer client device and the notary client device does not meet the minimum technical requirement.

4. The method of claim 3, further comprising:
identifying, by the one or more processors, a secondary client device, wherein the workflow transitions the remote online notarization session from the at least one of the signer client device and the notary client device that does not meet the technical requirement to the secondary client device.

5. The method of claim 1,
wherein the parameters further specify a requirement that an identity verification protocol be satisfied by the signer,
wherein the failure is detected based on the signer failing to satisfy the identity verification protocol, and
wherein the workflow comprises a series of elements that, when taken by the notary and the signer, verifies an identity of the signer.

6. The method of claim 1, further comprising:
wherein determining the requirement for the detected physical location is not satisfied comprises determining that a witness is required for the remote online notarization session to proceed in the detected physical location, and
wherein the workflow comprises transmitting a request to the witness to join the remote online notarization session and admitting the witness to join the remote online notarization session.

7. The method of claim 6, further comprising:
causing, by the one or more processors, an output of a selectable cure option that comprises an option for the notary to select the witness from a plurality of candidate witnesses.

8. The method of claim 1,
wherein detecting the failure further comprises detecting a defect in credentials of the notary, and
wherein the workflow includes an option for the signer to select a secondary notary to join the remote online notarization session.

9. Non-transitory computer-readable media comprising memory with instructions encoded thereon, the instructions, when executed by one or more processors, causing the one or more processors to:
determine, based on an expected physical location, parameters for establishing a remote online notarization session at the expected physical location, the remote online notarization session including participants, the participants including at least a signer and a notary and the parameters specifying the expected physical location;
establish the remote online notarization session according to the parameters, the signer connecting using a signer client device, and the notary connecting using a notary client device;
monitor, during the remote online notarization session, information from the signer client device and the notary client device;
detect, based on the parameters, a failure from the information, wherein to detect the failure, the instructions cause the one or more processors to determine, based on the information, that the signer client device is located at a detected physical location different from the expected physical location specified by the parameters;
responsive to the detection of the failure:
determine, based on the detected physical location, a requirement for the detected location is not satisfied;
pause the remote online notarization session; and
initiate a workflow that, when concluded, cures the failure and enables the remote online notarization session to proceed, wherein to cure the failure, the workflow at least satisfies the requirement for the detected physical location.

10. The non-transitory computer-readable media of claim 9, wherein the parameters require a minimum technical requirement of at least one of the signer client device and the notary client device.

11. The non-transitory computer-readable media of claim 10, wherein to detect the failure, the instructions cause the one or more processors to detect at least one capability of the signer client device and the notary client device does not meet the minimum technical requirement.

12. The non-transitory computer-readable media of claim 11, wherein the instructions further cause the one or more processors to identify a secondary client device, wherein the workflow transitions the remote online notarization session from the at least one of the signer client device and the notary client device that does not meet the technical requirement to the secondary client device.

13. The non-transitory computer-readable media of claim 9,
wherein the parameters further specify a requirement that an identity verification protocol be satisfied by the signer,
wherein the failure is detected based on the signer failing to satisfy the identity verification protocol,
wherein the workflow comprises a series of elements that, when taken by the notary and the signer, verifies an identity of the signer.

14. The non-transitory computer-readable media of claim 9,
wherein to determine the requirement for the detected physical location is not satisfied, the instructions cause the one or more processors to determine that a witness is required for the remote online notarization session to proceed in the detected physical location, and
wherein the workflow comprises transmitting a request to the witness to join the remote online notarization session and admitting the witness to join the remote online notarization session.

15. The non-transitory computer-readable media of claim 14, wherein the instructions further cause the one or more processors to cause an output of a selectable cure option that comprises an option for the notary to select the witness from a plurality of candidate witnesses.

16. The non-transitory computer-readable media of claim 9,
wherein to detect the failure, the instructions cause the one or more processors to detect a defect in credentials of the notary, and
wherein the workflow includes an option for the signer to select a secondary notary to join the remote online notarization session.

17. A system comprising:

non-transitory computer-readable media comprising memory with instructions encoded thereon; and one or more processors that, when executing the instructions, cause the one or more processors to:
- determine, based on an expected physical location, parameters for establishing a remote online notarization session at the expected physical location, the remote online notarization session including participants, the participants including at least a signer and a notary and the parameters specifying the expected physical location;
- establish the remote online notarization session according to the parameters, the signer connecting using a signer client device, and the notary connecting using a notary client device;
- monitor, during the remote online notarization session, information from the signer client device and the notary client device;
- detect, based on the parameters, a failure from the information, wherein to detect the failure, the instructions cause the one or more processors to determine, based on the information, that the signer client device is located at a detected physical location different from the expected physical location specified by the parameters;
- responsive to the detection of the failure:
  - pause the remote online notarization session; and
  - initiate a workflow that, when concluded, cures the failure and enables the remote online notarization session to proceed, wherein to cure the failure, the workflow at least satisfies a requirement for the detected physical location.

18. The system of claim 17, wherein the parameters further specify a minimum technical requirement of at least one of the signer client device and the notary client device.

* * * * *